United States Patent Office 3,150,167
Patented Sept. 22, 1964

3,150,167
PROCESS FOR PREPARING HYDROXY ALKYL
ACRYLATES AND METHACRYLATES
Howard J. Wright and John F. Bremmer, Kansas City,
Mo., assignors to Cook Paint & Varnish Company,
Kansas City, Mo., a corporation of Delaware
No Drawing. Filed Nov. 7, 1962, Ser. No. 236,111
7 Claims. (Cl. 260—486)

The present invention relates to a new and advantageous process for preparing hydroxy alkyl acrylates and methacrylates and is especially concerned with the preparation of hydroxy propyl methacrylate.

Broadly stated, the process involves reacting propylene oxide or other alkylene oxide and acrylic or methacrylic acid in the presence of an aluminum compound, particularly aluminum trichloride.

It is known that propylene oxide, for example, will react with acrylic acid or methacrylic acid under the influence of a catalyst to form hydroxy propyl acrylate or methacrylate. However, the known procedures involving this type of reaction are subject to a number of disadvantages. For example, substantial amounts of undesired polymeric by-products may be formed which necessitate difficult separation techniques. One reason for by-product formation is the fact that the acid homopolymerizes, particularly when the reaction involves prolonged heating at elevated temperatures as is usually necessary. The alkylene oxide also tends to homopolymerize under these conditions in the presence of basic or acid catalysts.

The polymeric by-products are difficult to satisfactorily separate from the desired product. Usually, it is essential to distill the reaction mass in order to recover the hydroxy alkyl acrylate or methacrylate from significant amounts of by-product and any catalyst residues. However, this results in a further loss of the desired product through further polymerization and a disproportionation reaction where, in the case of hydroxy propyl methacrylate, the monoester product is converted to dimethacrylate ester and propylene glycol.

The principal object of the present invention is to provide a novel process for preparing hydroxy alkyl acrylates and methacrylates whereby the above-noted prior art difficulties are obviated. Another object is the provision of a process for preparing the indicated acrylates and methacrylates with minimum by-product formation. A further object of the invention is to provide certain improvements in the production of hydroxy alkyl acrylates and methacrylates, especially hydroxy propyl methacrylate, by the catalytic reaction of the appropriate alkylene oxide and acid wherein catalyst residues and any small amounts of by-product which may be present can be readily and easily separated to give a product of highly attractive color and other desirable properties. Other objects will also be hereinafter apparent.

Broadly stated, the above objects are realized by the provision of a process wherein the alkylene oxide is reacted with the acrylic acid and/or methacrylic acid in the presence of an aluminum compound, notably aluminum trichloride. The success of the invention is due, at least to a large extent, to the use of the aluminum catalyst which has been found surprisingly effective for the reaction in question. The unexpected nature of this discovery is pointed up by the unique advantages offered by the present process over procedures involving the use of other catalysts. This is particularly apparent when the results of the present process are compared with procedures where other Friedel Crafts catalysts are used. Thus, for example, boron trifluoride, which is generally considered equivalent to aluminum chloride as a Friedel Crafts catalyst, is unsatisfactory for use herein. In particular, the boron trifluoride gives a poor degree of conversion with excessive buildup of polypropylene glycol and substantial homopolymerization of the acid. Stannic chloride, another Friedel Crafts catalyst, is also unsatisfactory as a catalyst for present purposes since the reaction with this catalyst gives large amounts of undesired acrylic or methacrylic homopolymer. Iron chloride is also not satisfactory since the reaction proceeds slowly with a substantial amount of undesired polymerization. Additionally, the resulting products have an undesirable color, presumably because of the presence of iron which cannot be satisfactorily removed.

Amine catalysts such as pyridine, trimethylbenzyl ammonium chloride, choline, triethyl amine and n-methyl morpholine suffer from several serious disadvantages. For one thing, the reaction using amine catalysts goes slowly and high temperatures are necessary to push the reaction to completion with the result that large amounts of acrylic or methacrylic polymer are built up. Additionally, the amines give products which are highly colored and the combination of bad color and undesired polymer necessitates distillation to obtain a useable product with the further difficulties attendant in distillation as mentioned above.

In contrast to the other catalysts which have been mentioned, the aluminum catalyst of the invention functions extremely well. Thus, it permits the reaction to occur rapidly at low temperature thereby avoiding any substantial degree of acid homopolymerization. Generally speaking, the amount of acrylic polymer which is formed in the present process is under 0.3%, a figure much lower than that attainable under prior procedures. Additionally, the alkylene oxide does not seem to polymerize to any significant extent under the conditions of the present invention. Furthermore, the aluminum chloride and whatever small amounts of by-products occur, may be easily removed without distillation by means of a simple washing procedure using water as such or in the form of an aqueous salt solution. Yields of the desired hydroxy alkyl acrylate are excellent running a minimum of 90% and the product color is a water white which is highly desirable for use in resins.

As indicated, propylene oxide and methacrylic acid are the preferred reactants. However, other lower alkylene oxides such as ethylene oxide or butylene oxide may also be reacted effectively with either acrylic acid or methacrylic acid. Normally, the reactants are used in equimolecular proportions although up to 20% by weight, excess of alkylene oxide may be utilized.

The reaction is rapidly and effectively carried out at temperatures in the preferred range of about 40° C. to 80° C. However, temperatures as high as 150° C. may be used although the temperature should not generally exceed 80° C. Additionally, the reaction should normally be run until the acid number of the acid reactant has been brought below 20, and preferably in the range of 5 to 15. Usually, this will occur in from about 40 to 120 minutes, the longer times being necessary at lower temperatures.

The reaction pressure may be atmospheric or superatmospheric although atmospheric pressure is preferred. Inert diluents may be used such as aromatic hydrocarbons (e.g. xylene), and alcohols typically butanol, but this is optional and it is generally preferred to operate without a solvent.

In a preferred way of carrying out the invention to prepare hydroxy propyl methacrylate, the aluminum trichloride is mixed with the methacrylic acid after which the propylene oxide is gradually added to the resulting mixture of catalyst and acid. This addition is desirably carried out over a period of, for example, about 30 to 90 minutes with cooling so that the temperature of the reaction, which is exothermic, does not exceed 80° C. After all of the propylene oxide is added, the reaction mixture is desirably held at a temperature of the order of 70–80° C. for from about 10 to 30 minutes until the reaction is complete as evidenced by reduction of the acid number of the methacrylic acid to 20 or below.

Usually the amount of catalyst utilized will fall in the range of 0.5 to 3 parts by weight of catalyst per 100 parts of the total weight of alkylene oxide, acid and catalyst with 2 parts catalyst a convenient amount. However, an amount of catalyst outside this range may also be used if desired.

The exact mechanism of the reaction herein is not fully understood. However, without intending to be limited to any particular theory or explanation, it appears possible that the reaction is brought about by the formation of some sort of aluminum complex which functions as the actual catalyst. The difficulty in determining the exact mechanism of the reaction herein, coupled with the undesirable results obtained when using other Friedel Crafts catalysts, e.g. boron trifluoride, points up the unexpected nature of the present process.

The invention is illustrated, but not limited, by the following examples wherein parts and percentages, unless otherwise referred to, are by weight:

Example 1

At room temperature 2 parts of aluminum trichloride technical grade were added to 56 parts of methacrylic acid. The addition of 42 parts of propylene oxide was started at a rate such that the addition was completed in thirty minutes to one hour. During this addition, the reaction was exothermic and the temperature was allowed to rise to, but not exceed 80° C. The reaction was held at 80° C., for one-half hour after the addition of oxide was complete at which time the acid number of the methacrylic acid was reduced to 20 or below.

The resulting product was washed, first with 40 parts of a solution comprising 70% water, 5% trisodium phosphate and 25% phosphoric acid. The product was drawn off at the bottom by gravity and then washed with 10 parts of a 20% sodium chloride solution. The thus washed water product was water white and had a polymer content of less than 0.3%. The yield of hydroxy propyl methacrylate was 93 parts.

Example 2

Example 1 was repeated except that 52 parts of acrylic acid and 46 parts of propylene oxide were used as the reactants, the oxide being added to the acid over a period of 50 minutes. The reaction mixture was held at 80° C. for one hour after the addition was completed. The resulting product was washed with 30 parts of a solution comprising 10% phosphoric acid, 5% trisodium phosphate and 85% water which brought down a sludge of impurities. This sludge was separated from the desired product which had a highly satisfactory water white color very low in polymer content as in the product of Example 1.

Example 3

This example illustrates the unpredictability of the present invention by showing the unsuitability of stannic chloride for use as a catalyst herein.

The process of Example 1 was repeated using stannic chloride as a catalyst in lieu of the aluminum trichloride. However, during the course of the reaction, the reaction mixture became so highly viscous due to excessive polymerization of the reactants that no satisfactory product could be obtained.

The above process using stannic chloride was again repeated except that .05 parts polymerization inhibitor (methyl ether of hydroquinone) was included. Again a highly viscous unsatisfactory reaction product was obtained.

It will be appreciated that various modifications may be made in the invention as described without deviating from the scope thereof as set forth in the following claims wherein:

We claim:

1. The process for preparing hydroxy propyl methacrylate which comprises contacting propylene oxide with methacrylic acid at a temperature not exceeding 80° C., and in the presence of aluminum trichloride as catalyst.

2. The process of claim 1 wherein the desired hydroxy compound is separated from any by-products and the catalyst by washing with an aqueous solution of sodium phosphate and phosphoric acid.

3. The process of claim 1 wherein the reaction is continued until the acid number of the acid does not exceed 20.

4. The process for preparing a hydroxy compound selected from the group consisting of hydroxy alkyl acrylates and methacrylates which comprises adding a lower alkylene oxide to an acid selected from the group consisting of acrylic acid and methacrylic acid, and a catalytically effective amount of aluminum trichloride, while maintaining a temperature for the resulting mixture which is not in excess of 80° C., the amount of alkylene oxide being at least the molecular equivalent of the acid with up to 20% by weight excess alkylene oxide, maintaining said reaction mixture at a temperature in the range of 70–80° C., until the acid number of the reaction mixture is between 5 and 15 and then washing the reaction product with an aqueous solution of phosphoric acid and sodium phosphate.

5. The process of claim 4 wherein said alkylene oxide is propylene oxide and said acid is methacrylic acid.

6. The process of claim 4 wherein the aluminum trichloride is present in an amount between 0.5 and 3 parts by weight per 100 parts of the total weight of the alkylene oxide, acid and catalyst.

7. The process for preparing a hydroxy alkyl compound selected from the group consisting of hydroxy alkyl acrylates and methacrylates which comprises contacting a lower alkylene oxide with an acid selected from the group consisting of acrylic acid and methacrylic acid at a temperature up to 150° C. and in the presence of aluminum trichloride.

References Cited in the file of this patent

UNITED STATES PATENTS

| | | |
|---|---|---|
| 2,484,487 | Caldwell | Oct. 11, 1949 |
| 2,929,835 | Hayes | Mar. 22, 1960 |

FOREIGN PATENTS

| | | |
|---|---|---|
| 814,360 | Great Britain | June 3, 1959 |